United States Patent
Shi et al.

(10) Patent No.: US 12,000,135 B2
(45) Date of Patent: Jun. 4, 2024

(54) ULTRA-LARGE HORIZONTAL SEEPAGE TEST SYSTEM WITH INTELLIGENT GRADED LOADING AND VARIABLE SEEPAGE PATH

(71) Applicant: Nanjing Hydraulic Research Institute, Nanjing (CN)

(72) Inventors: Beixiao Shi, Nanjing (CN); Shengshui Chen, Nanjing (CN); Hua Ling, Nanjing (CN); Jianwei Zhang, Nanjing (CN); Guangze Shen, Nanjing (CN); Hua Fu, Nanjing (CN); Huaqiang Han, Nanjing (CN); Weiwei Xu, Nanjing (CN)

(73) Assignee: NANJING HYDRAULIC RESEARCH INSTITUTE, Nanjing (CN)

(*) Notice: Subject to any disclaimer, the term of this patent is extended or adjusted under 35 U.S.C. 154(b) by 426 days.

(21) Appl. No.: 17/483,038

(22) Filed: Sep. 23, 2021

(65) Prior Publication Data
US 2022/0010539 A1    Jan. 13, 2022

Related U.S. Application Data

(63) Continuation of application No. PCT/CN2021/086479, filed on Apr. 17, 2020.

(30) Foreign Application Priority Data

Apr. 17, 2020   (CN) .................. 202010306843.X (51) Int. Cl.
E03F 7/04      (2006.01)
E03B 7/07      (2006.01)
(Continued)

(52) U.S. Cl.
CPC ............... E03F 7/04 (2013.01); E03B 7/075 (2013.01); E03B 11/10 (2013.01);
(Continued)

(58) Field of Classification Search
CPC . E03F 7/04; E03B 7/075; E03B 11/10; G01N 15/0806; G01N 15/0826; G01N 15/082
See application file for complete search history.

(56) References Cited

U.S. PATENT DOCUMENTS

2020/0080924 A1* 3/2020 Zhou ..................... G01F 9/003

FOREIGN PATENT DOCUMENTS

| CN | 206161492 U | * | 5/2017 | |
| CN | 110687033 A | * | 1/2020 | |
| CN | 110749497 B | * | 1/2021 | ............... G01N 3/02 |

* cited by examiner

*Primary Examiner* — Jonathan M Dunlap
(74) *Attorney, Agent, or Firm* — WPAT, PC (57) ABSTRACT

An ultra-large horizontal seepage test system with intelligent graded loading and variable seepage path is provided, which includes a water storage system, a water pressure system, a horizontal seepage test system and an intelligent loading and control system. The water storage system, the water pressure system and the horizontal seepage test system are connected in sequence, and the water pressure system is used to apply a water pressure and a vertical pressure to a test piece to be tested in the horizontal seepage test system. An outlet valve of the horizontal seepage test system is connected to the water storage system, and the intelligent loading and control system is used to control operations of electrical components of the water pressure system and the horizontal seepage test system. With the test system, a water head pressure can be loaded intelligently, and an infiltration angle of water inflow can be adjusted.

10 Claims, 4 Drawing Sheets

(51) Int. Cl.
*E03B 11/10* (2006.01)
*G01N 15/08* (2006.01)
(52) U.S. Cl.
CPC ..... *G01N 15/0806* (2013.01); *G01N 15/0826* (2013.01); *G01N 15/082* (2013.01)

ULTRA-LARGE HORIZONTAL SEEPAGE TEST SYSTEM WITH INTELLIGENT GRADED LOADING AND VARIABLE SEEPAGE PATH

TECHNICAL FIELD

The disclosure relates to the field of water conservancy engineering test development, and particularly to an ultra-large horizontal seepage test system with intelligent graded loading and variable seepage path.

DESCRIPTION OF RELATED ART

The permeability of dam materials is the most concerned issue/topic in the construction of earth-rock dams. A seepage test is one of current commonly used methods for determining a permeability coefficient and hydraulic gradients of deformation and failure of coarse-grained materials. Current commonly used seepage apparatuses have the following shortcomings:
1. a water flow direction for the seepage test is a vertical direction, which is inconsistent with an actual horizontal or approximately horizontal seepage;
2. a diameter of each of the commonly used seepage apparatuses is merely 30 centimeters (cm) and a maximum particle size of a test piece is only 6 cm, which cannot meet the requirement that a maximum particle size of the dam materials can be up to 1 meter, therefore, there is a large scale-down effect;
3. a water head pressure that can be applied is very small, and is artificially set and difficult to be changed, which cannot meet an actual requirement of a current project;
4. a failure phenomenon cannot be observed during an anti-filter material test, and a misjudgment is easy to be made;
5. since an overburden stress cannot be applied by the commonly used seepage apparatuses, the seepage test is carried out merely under a self-weight stress of the test piece, which is inconsistent with an actual situation that the test piece may be subjected to an overburden stress of up to 2 MPa.

A Chinese patent application CN 110749497A discloses a rock creep triaxial test system and method with continuous water environment effect. The technical solution thereof is as follows: a pressure cylinder is connected to a cross beam, and the cross beam is supported on a base of a testing machine through a pillar; a water environment confining pressure system is arranged between the base and the cross beam; a dynamic stress and strain acquisition system is connected to the water environment confining pressure system; and the dynamic stress and strain acquisition system is connected to a computer, a digital controller, a servo controller, a hydraulic source and an oil pipeline in sequence. However, for this patent application, an intelligent loading cannot be achieved, an infiltration angle of water inflow cannot be adjusted, a seepage path of a test piece cannot be changed, an overburden stress cannot be provided, a test failure process cannot be visualized, and the patent application cannot be applied to an ultra-large simulation mechanism.

SUMMARY

An objective of the disclosure is to overcome the above-mentioned shortcomings, and provide an ultra-large horizontal seepage test system with intelligent graded loading and variable seepage path. The test system for example has following good effects. In particular, a water head pressure can be loaded intelligently, an infiltration angle of water inflow can be adjusted, a seepage path of a test piece is variable, an overburden stress can be provided, a test failure process can be visualized, and an ultra-large simulation of the test piece can be achieved. The test system is simple and convenient to operate, and all components thereof can be disassembled flexibly and are convenient for transportation and installation.

To achieve the above objective, the disclosure adopts following technical solutions.

Specifically, an ultra-large horizontal seepage test system with intelligent graded loading and variable seepage path is provided, which may include a water storage system, a water pressure system, a horizontal seepage test system and an intelligent loading and control system. The water storage system, the water pressure system and the horizontal seepage test system are connected in sequence, and the water pressure system is used to apply a water pressure and a vertical pressure to a test piece to be tested in the horizontal seepage test system. An outlet valve of the horizontal seepage test system is connected to the water storage system, and the intelligent loading and control system is used to control operations of electrical components of the water pressure system and the horizontal seepage test system.

In an embodiment, the water storage system includes a water storage tank and a backwater utilization pool, and the water storage tank is connected to the backwater utilization pool through an automatic submersible pump and a water pipe. When a water volume of the water storage tank is less than 500 liters, the submersible pump automatically starts to inject water for the water storage tank; and when the water volume reaches 500 liters, the submersible pump automatically stops injecting water, so as to ensure the continuous water flow of a pressurized pump during a test.

In an embodiment, the water pressure system comprises three groups of inlet pipes connected in parallel to the water storage tank, the three groups of inlet pipes are provided with three inlet valves respectively, the three groups of inlet pipes are provided with three pressurized pumps behind the three inlet valves respectively, and the three groups of inlet pipes behind the three pressurized pump are merged into one group of inlet pipe and connected to the horizontal seepage test system, a first pressure gauge and a second pressure gauge are sequentially provided on the one group of inlet pipe, an electric regulating valve is arranged on an inlet pipe between the first and second pressure gauges, an outlet of the electric regulating valve is connected to the water storage tank through a pipeline and thereby the electric regulating valve is configured to release excess water back to the water storage tank.

In an embodiment, the pressure gauges are installed between the pressurized pumps and the horizontal seepage test chamber, and measured values from the pressure gauges are fed back to the intelligent loading and control system. The electric regulating valve automatically starts and stops to adjust a pressure balance of the first pressure gauge and the second pressure gauge to keep constant of a water head pressure after passing through the pressure gauges. The intelligent loading and control system automatically controls starting and stopping of the pressurized pump to achieve a water head pressure required for the test. The pressurized pumps are provided with automatic starting devices. The automatic starting devices are capable of being started independently or jointly. A design flow range for the automatic starting device is between 4 m³/h to 28 m³/h, and a test water pressure range therefor is adjustable from 1 meter to 200 meters.

In an embodiment, an outlet of the electric regulating valve is connected to the water storage tank through a pipeline for releasing excess water back into the water storage tank.

In an embodiment, the horizontal seepage test system includes a horizontal seepage test chamber, a four-post cross-beam frame, a guide trail trolley, a power source and an actuator, where the horizontal seepage test chamber is placed on the guide trail trolley, such that it is convenient to move the horizontal seepage test chamber during use. When installing and disassembling the test piece, it can be pushed out from under the four-post cross-beam frame. When the test piece is installed and disassembled, the horizontal seepage test chamber is capable of being pushed out from a bottom of the four-post cross-beam frame. After the installation of the test piece is completed, the horizontal seepage test chamber is pushed to be under a force measuring sensor of the four-post cross-beam frame, such that the force measuring sensor is aligned with a top plate of the horizontal seepage test chamber, thereby effectively ensuring the balance of the horizontal seepage test chamber when a vertical stress is applied thereto.

In an embodiment, the actuator is located directly below the guide trail trolley, and the power source is connected to the actuator and used to provide a vertical force for the actuator. The actuator is able to provide a vertical stress with a maximum of 4 MPa for a bottom plate of the horizontal seepage test chamber, and a loading mode of the vertical stress can be a displacement or stress control mode, and a loading speed of the vertical stress can be determined by an inputting manner. When an upward force is applied to the guide trail trolley under the horizontal seepage test chamber by the actuator, the four-post cross-beam frame is fixed with a foundation and an effective counter-force support is provided.

In an embodiment, a force measuring sensor is provided under a middle of a top portion of the four-post cross-beam frame, and a lower part of the force measuring sensor is in contact with a top plate of the horizontal seepage test chamber. The force measuring sensor is able to measure a vertical stress up to 4 MPa with a measurement accuracy thereof of is 0.5%.

In an embodiment, the horizontal seepage test chamber includes a rectangle-shaped body composed of a bottom plate, a top plate, a front side plate, a rear side plate, a left permeable plate and a right permeable plate, where a sealed inlet pool is arranged outside the left permeable plate, an inlet valve is arranged on the inlet pool, a sealed outlet pool is arranged outside the right permeable plate, and an outlet valve is installed on the outlet pool. The outlet pool plays a role of receiving infiltrated water flow and short-term precipitation. The water after precipitation is put into the backwater utilization tank through the outlet valve.

In an embodiment, the left permeable plate is provided with circular holes with a diameter of 0.5 mm and a spacing of 0.5 mm. The left permeable plate is tightly connected to the front side plate, the rear side plate, the top plate and the bottom plate of the horizontal seepage test chamber, so as to ensure water flow to infiltrate into the test piece freely.

In an embodiment, a slope of the left permeable plate is one of 1:1, 1:1.3, 1:1.4, 1:1.5 and 1:1.6 and water inflow infiltration tests at different angles are able to be effectively carried out through replacing the permeable plate with a permeable plate of a different slope.

In an embodiment, the front side plate and the rear side plate are each provided with an observation window, and the observation window is sealed and installed on corresponding one of the front side plate and the rear side plate by a transparent material, so that the failure process of the test piece can be conveniently observed. The front side plate and the rear side plate of the horizontal seepage test chamber are composed of two elongated plates with a width of 50 cm and one elongated plate with a width of 100 cm, which are capable of being arbitrarily combined into test pieces with three sizes of 1 m, 1.5 m and 2 m, and the seepage path of the specimens can be changed into three sizes of 1 m, 1.5 m and 2 m, thereby meeting the requirements of a horizontal seepage test for test pieces composed of one, two or three test materials.

In an embodiment, each of the elongated plates is provided with a circular observation window with a diameter of 30 cm, so that a failure process of the test piece can be conveniently observed. The front side plate and the rear side plate of the horizontal seepage test chamber are each connected with the top plate and the bottom plate by bolts. The elongated plates of each of the front side plate and the rear side plate are connected by bolts, the elongated plates and the top plate are connected by bolts, and the elongated plates and the bottom plate are connected by bolts.

In an embodiment, the inlet valve is connected to a water pipe behind the second pressure gauge of the water pressure system, and water is pumped into the inlet pool by the corresponding pressurized pump to keep the water to be full of the inlet pool and infiltrate into the horizontal seepage test chamber in a manner of crossing an entire cross-section of the left permeable plate.

In an embodiment, the outlet valve is connected to the backwater utilization pool of the water storage system through a water pipe.

In an embodiment, the four-post cross-beam frame includes: four upright posts, and a transversal bearing plate sleeved on the four posts and being movable up and down relative to the four posts. Specifically, a lower end of each of the upright posts is fixed on a foundation, and an upper end of each of the upright posts is connected to the transversal bearing plate for providing a counterforce. The lower end of the four-post cross-beam frame is firmly connected with the foundation, such that an effective counter-force support for pressurizing the test piece is provided. The transversal bearing plate flexibly and tightly contacts with the front side plate, the rear side plate, the left permeable plate and the right permeable plate of the horizontal seepage test chamber, and an infiltration water flow in the test piece is unable to infiltrate through portions of the transversal bearing plate contacting with the horizontal seepage test chamber.

In an embodiment, the intelligent loading and control system include a target setting computer installed with a signal receiving part and a signal transmitting part. The intelligent loading and control system automatically collects data from the pressure gauge, the pressurized pump, the force measuring sensor and the electric regulating valve; intelligently determines a difference between a set value and a force measured by the force measuring sensor, and sends a command to the power source so as to apply a vertical force or stop applying the vertical force through the force measuring sensor; intelligently determines a difference between the set value and a value from the pressure gauge; and sends a water pressure adjustment command to the corresponding pressurized pump and the electric regulating valve, so as to adjust a water supply through starting or stopping the pressurized pumps, and releases excess water back to the water storage tank through starting and stopping the electric regulating valve, thereby effectively ensuring that a water pressure supplied to the horizontal seepage test chamber reaches a predetermined value.

The horizontal seepage test system of the disclosure has the following beneficial effects.

The test system of the disclosure can realize intelligent graded loading of a water head pressure at the maximum. Because the left permeable plate can adopt different slopes, the infiltration water flow angle can be adjusted, the test materials can be layered, the seepage path is horizontal, and the size of the test piece can be up to 1 meter wide. An ultra-large seepage test system with a seepage path that can be switched between 1.0 meter, 1.5 meters and 2.0 meters can be achieved. The test system is used to carry out seepage tests on dam construction materials, and thus a permeability coefficient of a test piece, hydraulic gradient of seepage deformation and a filter performance of the filter materials can be determined. The beneficial effects are specifically embodied in the following aspects.

1. The pressurized pumps are located between the water storage tank and the pressure gauge and can work independently, or two or three pressurized pumps can work at the same time. The pressure gauge feeds back a water head pressure to the intelligent loading and control system, and the intelligent loading and control system transmits working commands to the three pressurized pumps and the electric regulating valve simultaneously, thereby effectively ensuring that the water head pressure of the pressure gauge can change arbitrarily between 0.1 m and 200 m.
2. The permeable plate located at the water inlet is provided with circular holes with a diameter of 0.5 mm and a spacing of 0.5 mm. The permeable plate is tightly connected to the horizontal seepage test chamber, thereby ensuring the free infiltration of water flow into the test piece. There are permeable plates respectively having slopes of 1:1, 1:1.3, 1:1.4, 1:1.5 and 1:1.6. By replacing permeable plates with different slopes, water infiltration tests at different angles can be effectively carried out.
3. The front side plate and the rear side plate of the horizontal seepage test chamber on the guide trail trolley are composed of two plates with a width of 50 cm and one plate with a width of 1 m, which are able to be arbitrarily combined into test pieces with three sizes of 1 m, 1.5 m and 2 m, and the seepage path of the specimens are also able to be changed into three sizes of 1 m, 1.5 m and 2 m, thereby meeting the requirements of a horizontal seepage test seepage test for test pieces composed of one, two or three test materials.
4. The intelligent loading and control system automatically collects data from the pressure gauge, the pressurized pump, the force measuring sensor and the electric regulating valve, intelligently determines a difference between a set value and a force measured by the force measuring sensor, and sends a command to the power source so as to apply a vertical force or stop applying the vertical force through the force measuring sensor; intelligently determines a difference between the set value and a value from the pressure gauge, sends a water pressure adjustment command to the corresponding pressurized pump and the electric regulating valve, so as to adjust a water supply through starting or stopping the pressurized pumps, and releases excess water back to the water storage tank through starting and stopping the electric regulating valve, thereby effectively ensuring that a water pressure supplied to the horizontal seepage test chamber reaches a predetermined value.
5. The horizontal seepage test chamber is placed on the guide trail trolley. When the test piece is installed and disassembled, the horizontal seepage test chamber can be pushed out from a bottom of the four-post cross-beam frame. After the installation of the test piece is completed, the horizontal seepage test chamber is pushed to be under the force measuring sensor of the four-post cross-beam frame, such that the force measuring sensor is aligned with a top plate of the horizontal seepage test chamber, thereby effectively ensuring the balance of the horizontal seepage test chamber when a vertical stress is applied thereto.
6. The four-post cross-beam frame includes four upright posts and a transversal bearing plate. A lower end of each of the upright posts is fixed on the foundation, and an upper end of the upright posts is connected with the transversal bearing plate. The transversal bearing plate is square, with a force measuring sensor under the middle of the transversal bearing plate. The force measuring sensor is in contact with a top plate of the horizontal seepage test chamber. When the guide trolley under the horizontal seepage test chamber is provided with an upward acting force by the actuator, the four-column beam frame is fixed with the foundation and an effective counterforce support is provided.

REFERENCE NUMERALS

00—Water storage system; 01—Water storage tank; 011—Backwater utilization pool; 10—Water pressure system; 02—First inlet valve; 03—Second inlet valve; 04—Third inlet valve; 05—First pressurized pump; 06—Second pressurized pump; 07—Third pressurized pump; 08—Electric regulating valve; 09—First pressure gauge; 101—Second pressure gauge; 20—Horizontal seepage test system; 200—Horizontal seepage test chamber; 21—Fourth inlet valve; 22—Inlet pool; 23—Left permeable plate; 24—Top plate; 25—Bottom plate; 26—Right permeable plate; 27—Outlet pool; 28—Outlet valve; 29—Force measuring sensor; 30—Four-post cross-beam frame; 201—

Observation window; 202—Actuator; 203—Power source; 204—Test piece; 205—Guide trail trolley; 206—Front side plate; 207—Rear side plate; 301—Transversal bearing plate; 302—Upright post; 303—Foundation; 40—Intelligent loading and control system; 41—Target setting system; 42—Receiving a pressurized pump signal; 43—Receiving a pressure gauge signal; 44—Receiving an electric regulating valve signal; 45—Receiving a force measuring sensor signal; 46—A signal for starting or stopping a pressurized pump; 47—A signal for starting or stopping a power source; 48—a signal indicating a target value of a force measuring sensor; 49—A signal for regulating an opening degree of an electric regulating valve; 50—Signal receiving part; 60—Signal transmitting part.

DETAILED DESCRIPTION OF EMBODIMENTS

The disclosure will be further explained with reference to accompany drawings and embodiments.

The structure, scale, size and the like shown in the accompany drawings in the specification are merely used to match the contents disclosed in the specification for the understanding and reading of those familiar with the technology, and are not used to limit the implementation conditions of the disclosure, so it has no technical substantive significance. Any modification of structure, change of scale relationship or adjustment of size should still fall within the scope covered by the technical contents of the disclosure without affecting the effects and purpose achieved by the disclosure. Further, the terms such as "upper", "lower", "left", "right", "middle" and "one" cited in the specification are merely for convenience of description and clarity, and are not used to limit the implementable scope of the disclosure. The change or adjustment of their relative relations shall also be regarded as the implementable scope of the disclosure without substantial change of technical contents.

As shown in FIGS. 1 to 8, an ultra-large horizontal seepage test system with intelligent graded loading and variable seepage path is provided, which includes a water storage system 00, a water pressure system 10, a horizontal seepage test system 20 and an intelligent loading and control system 40. The water storage system 00, the water pressure system 10 and the horizontal seepage test system 20 are connected in sequence, and the water pressure system 10 is used to apply a water pressure and a vertical pressure to a test piece 204 to be tested in the horizontal seepage test system 20. An outlet valve 28 of the horizontal seepage test system 20 is connected to the water storage system 00. The intelligent loading and control system 40 is used to control operations of electrical components of the water pressure system 10 and the horizontal seepage test system 20.

Figure 1:
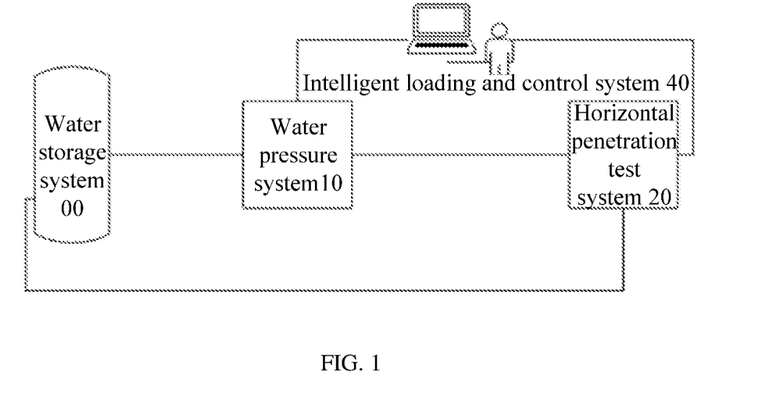
FIG. 1 is an overall schematic structural view of an ultra-large horizontal seepage test system with intelligent graded loading and variable seepage path according to an embodiment of the disclosure.
Figure 2:
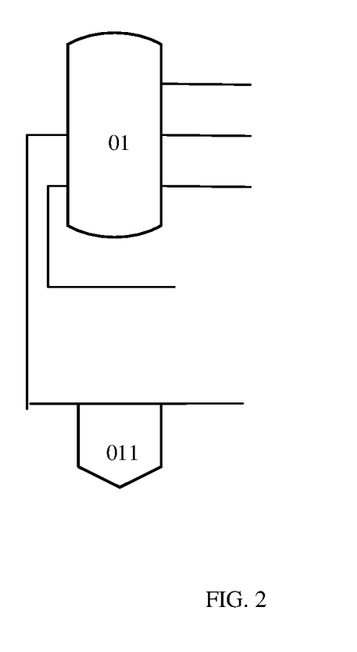
FIG. 2 is a schematic view of a water storage system according to an embodiment of the disclosure.

The water storage system 00 includes a water storage tank 01 and a backwater utilization pool 011, and the water storage tank 01 is connected to the backwater utilization pool 011 through an automatic submersible pump and a water pipe. The submersible pump automatically starts to inject water for the water storage tank 01 when a water volume of the water storage tank 01 is lower than 500 liters, and automatically stops injecting water when the water volume reaches 500 liters, thereby ensuring continuous water flow of a pressurized pump during a test.

Figure 4:
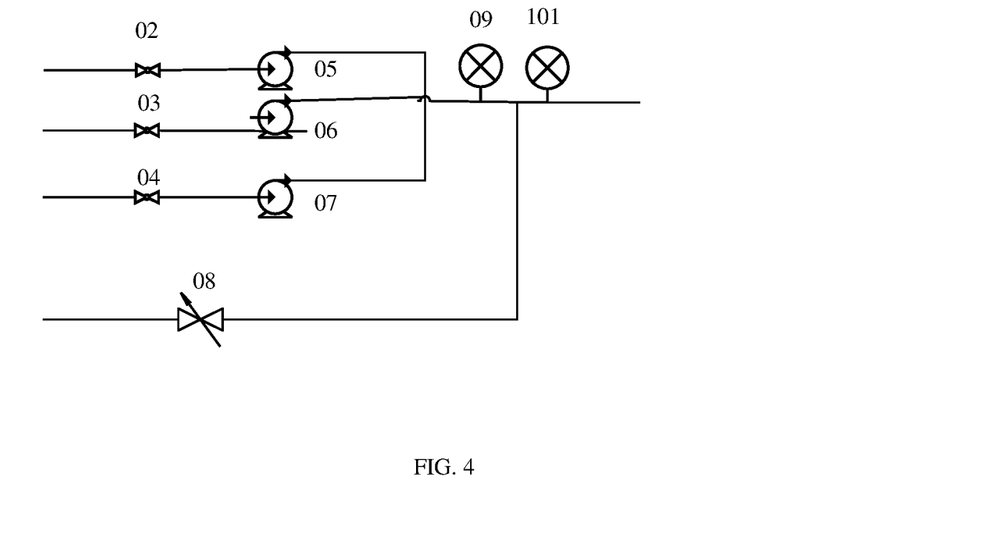
FIG. 4 is a schematic view of a water pressure system according to an embodiment of the disclosure.

The water pressure system 10 includes three groups of inlet pipes connected in parallel to the water storage tank 01, the three groups of inlet pipes are provided with three inlet valves respectively, and the three groups of inlet pipes are provided with three pressurized pumps behind the three inlet valves respectively. The three groups of inlet pipes behind the three pressurized pumps are merged into one group of inlet pipe and connected to a horizontal seepage test chamber 200 of the horizontal seepage test system 20. A first pressure gauge 09 and a second pressure gauge 101 are sequentially provided on the one group of inlet pipe. An electric regulating valve 08 is provided on an inlet pipe between the two pressure gauges, and an outlet of the electric regulating valve 08 is connected to the backwater utilization pool 011 through a pipeline.

The three inlet valves are a first inlet valve 02, a second inlet valve 03 and a third inlet valve 04. The three pressurized pumps are a first pressurized pump 05, a second pressurized pump 06 and a third pressurized pump 07. Inlet positions of the first inlet valve 02, the second inlet valve 03 and the third inlet valve 04 are connected in parallel with the water storage tank 01, and outlet positions are respectively connected to the first pressurized pump 05, the second pressurized pump 06 and the third pressurized pump 07. The first pressurized pump 05, the second pressurized pump 06, and the third pressurized pump 07 are energy sources of water pressures.

The pressure gauges are installed between the pressurized pumps and the horizontal seepage test chamber 200, and measured values from the pressure gauges are fed back to the intelligent loading and control system 40. The electric regulating valve 08 automatically starts or stops to adjust a pressure balance of the first pressure gauge 09 and the second pressure gauge 101 to keep constant of a water head pressure after passing through the pressure gauges. The intelligent loading and control system 40 automatically controls starting and stopping of the pressurized pumps to achieve a water head pressure required for the test. The pressurized pumps are provided with automatic starting devices respectively. The automatic starting devices can be started individually or jointly. A corresponding designed flow range is between 4 $m^3/h$ to 28 $m^3/h$, and a corresponding test water pressure range is adjustable from 1 m to 200 m.

An outlet of the electric regulating valve 08 is connected to the water storage tank through a pipeline, and thereby the electric regulating valve is configured to release excess water back to the water storage tank 01.

Figure 3:
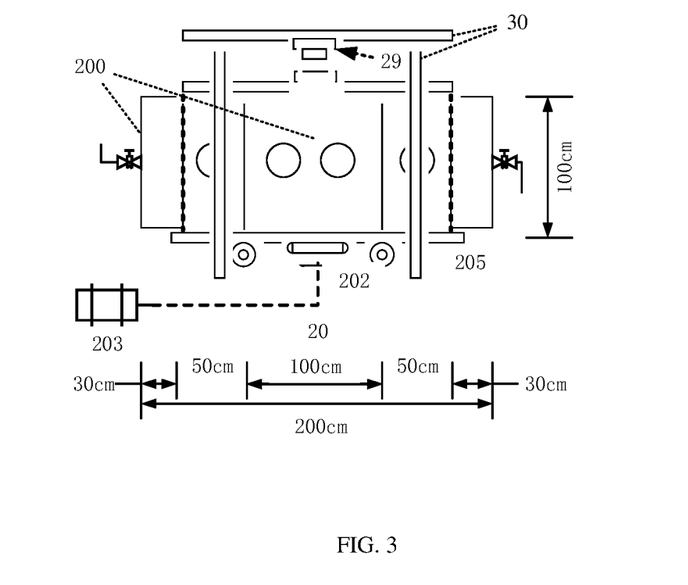
FIG. 3 is a schematic view of a horizontal seepage test system according to an embodiment of the disclosure.

The horizontal seepage test system 20 includes the horizontal seepage test chamber 200, a four-post cross-beam frame 30, a guide trail trolley 205, a power source 203 and an actuator 202. The horizontal seepage test chamber 200 is placed on the guide trail trolley 205, such that it is convenient to move the horizontal seepage test chamber 200 during use. The guide trail trolley 205 is a carrier of the horizontal seepage test chamber 200, and a bottom plate of the horizontal seepage test chamber 200 is connected to the guide trail trolley 205, which can facilitate the production of a test piece and complete the test. When the test piece 204 is installed and disassembled, the horizontal seepage test chamber 200 can be pushed out from a bottom of the four-post cross-beam frame 30. After the installation of the test piece 204 is completed, the horizontal seepage test chamber 200 is pushed to be under the force measuring sensor 29 of the four-post cross-beam frame 30, such that the force measuring sensor 29 is aligned with a top plate of the horizontal seepage test chamber 200, thereby effectively ensuring the balance of the horizontal seepage test chamber 200 when a vertical stress is applied thereto.

The actuator 202 is located directly below the guide trail trolley 205, and the power source 203 is connected to the actuator 202 and is used to provide a vertical force for the actuator 202. The actuator 202 can provide a vertical stress with a maximum of 4 MPa for the bottom plate of the horizontal seepage test chamber 200, and a loading mode of the vertical stress can be a displacement or stress control mode, and a loading speed of the vertical stress can be determined by an inputting manner. When an upward force is applied to the guide trail trolley 205 under the horizontal seepage test chamber 200 by the actuator 202, the four-post cross-beam frame 30 is fixed with a foundation and an effective counter-force support is provided.

Figure 8:
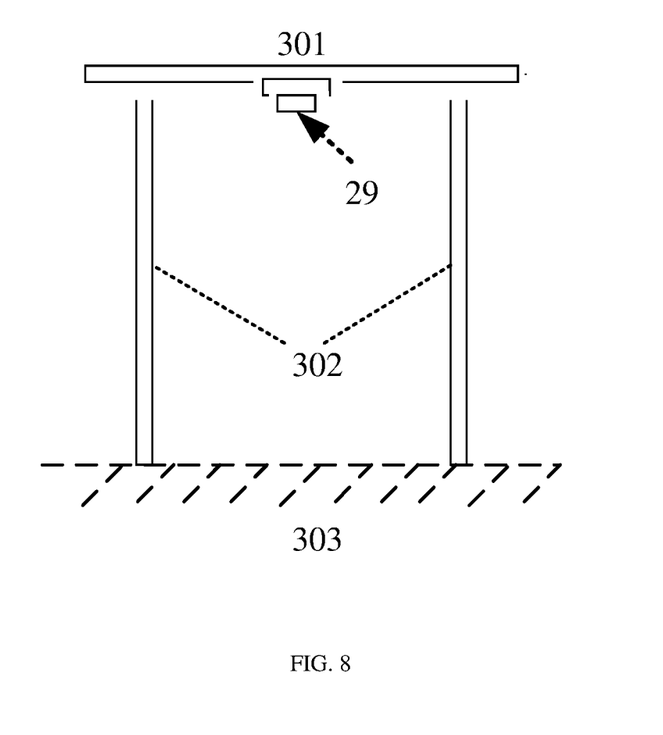
FIG. 8 is a schematic view of a four-post cross-beam frame according to an embodiment of THE DISCLOSURE.

The force measuring sensor 29 is arranged under a middle of a top portion of the four-post cross-beam frame 30, and a lower part of the force measuring sensor 29 is in contact with a top plate of the horizontal seepage test chamber. The force measuring sensor 29 can measure a vertical stress up to 4 MPa, and the measurement accuracy thereof is 0.5%.

Figure 5:
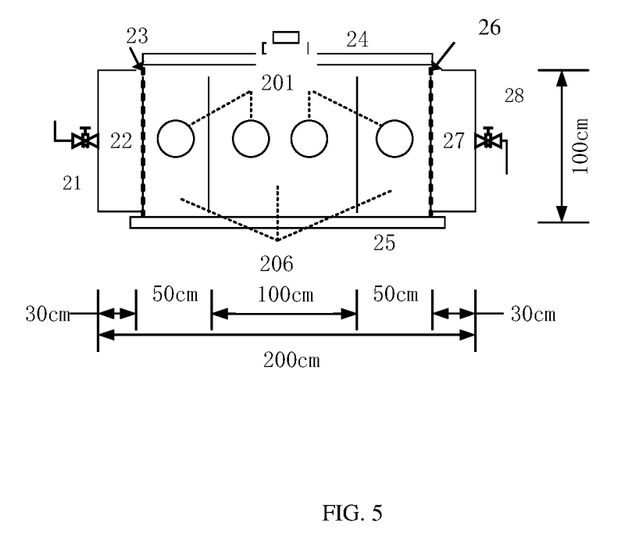
FIG. 5 is a side view of a horizontal seepage test chamber according to an embodiment of the disclosure.
Figure 6:
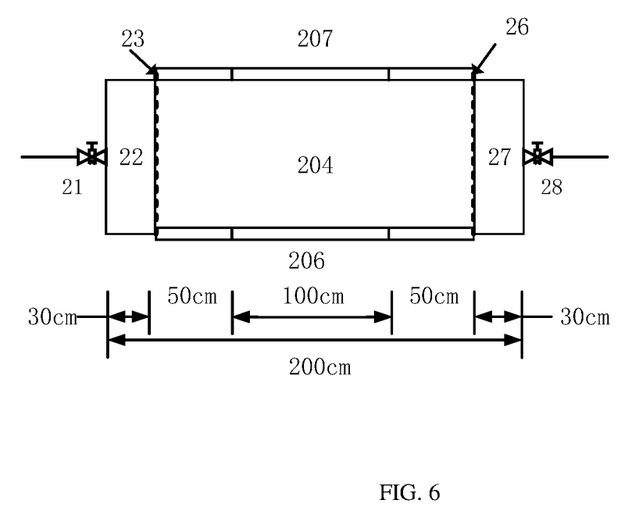
FIG. 6 is a front view of a horizontal seepage test chamber according to an embodiment of the disclosure.

The horizontal seepage test chamber 200 includes a rectangle-shaped body composed of a bottom plate 25, a top plate 24, a front side plate 206, a rear side plate 207, a left permeable plate 23 and a right permeable plate 26. Specifically, a sealed inlet pool 22 is arranged outside the left permeable plate, a fourth inlet valve 21 is arranged on the inlet pool 22, and a sealed outlet pool 27 is arranged outside the right permeable plate 26. An outlet valve 28 is installed on the outlet pool 27 and connected to backwater utilization pool 011 of the water storage system through a water pipe.

The left permeable plate 23 is provided with circular holes with a diameter of 0.5 millimeters (mm) and a spacing of 0.5 mm (that is to say, a diameter of each of the circular hole is 0.5 mm, and a spacing of each two adjacent circular holes is 0.5 mm). The left permeable plate 23 is tightly connected to the front side plate 206, the rear side plate 207, the top plate 24 and the bottom plate 25 of the horizontal seepage test chamber 200, so as to ensure water flow to infiltrate into the test piece freely.

A slope of the left permeable plate 23 at the inlet pool 22 may be one of 1:1, 1:1.3, 1:1.4, 1:1.5, and 1:1.6, which can be easily replaced according to different infiltration angles. By replacing a permeable plate of a different slope, water infiltration tests at different angles can be effectively carried out. The outlet pool 27 plays a role of receiving infiltrated water flow and short-term precipitation. The water after precipitation is put into the backwater utilization tank 011 through the outlet valve 28.

The front side plate 206 and the rear side plate 207 are each provided with a circular observation window 201 with a diameter of 30 cm. The observation window 201 is sealed and installed on corresponding one of the front side plate 206 and the rear side plate 207 by a transparent material, so that the failure process of the test piece can be conveniently observed. The front side plate and the rear side plate of the horizontal seepage test chamber 200 are each composed of two elongated plates each with a width of 50 cm and one elongated plate with a width of 100 cm, which can be arbitrarily combined into test pieces with three sizes of 1 m, 1.5 m and 2 m, and the seepage path of the test pieces can be changed into three sizes of 1 m, 1.5 m and 2 m, which can meet the requirements of a horizontal seepage test for a test piece (test pieces) composed of one, two or three test materials.

The front side plate and the rear side plate of the horizontal seepage test chamber 200 are each connected with the top plate and the bottom plate by bolts. The elongated plates of each of the front side plate and the rear side plate are connected by bolts, the elongated plates and the top plate are connected by bolts, and the elongated plates and the bottom plate are connected by bolts.

The fourth inlet valve 21 is connected to the water pipe behind the second pressure gauge 101 of the water pressure system 10, and water is pumped into the inlet pool 22 by the corresponding pressurized pumps to keep water to be full of in the inlet pool and infiltrate into the horizontal seepage test chamber in a manner of crossing an entire cross-section of the left permeable plate.

The four-post cross-beam frame 30 includes four upright posts 302 and a transversal bearing plate 301 sleeved on the four upright posts 302 and being movable up and down relative to the four posts 302. A lower end of each of the upright posts 302 is fixed on the foundation 303, and an upper end of the upright posts 302 is connected with the transversal bearing plate 301 to provide a counterforce. A lower end of the four-post cross-beam frame 30 is firmly connected with the foundation 303, such that an effective counter-force support for pressurizing the test piece 204 is provided. The transversal bearing plate 301 flexibly and tightly contacts with the front side plate, the rear side plate, the left permeable plate and the right permeable plate of the horizontal seepage test chamber 200, and an infiltration water flow in the test piece 204 will not infiltrate through portions of the transversal bearing plate 301 contacting with the horizontal seepage test chamber 200.

Figure 7:
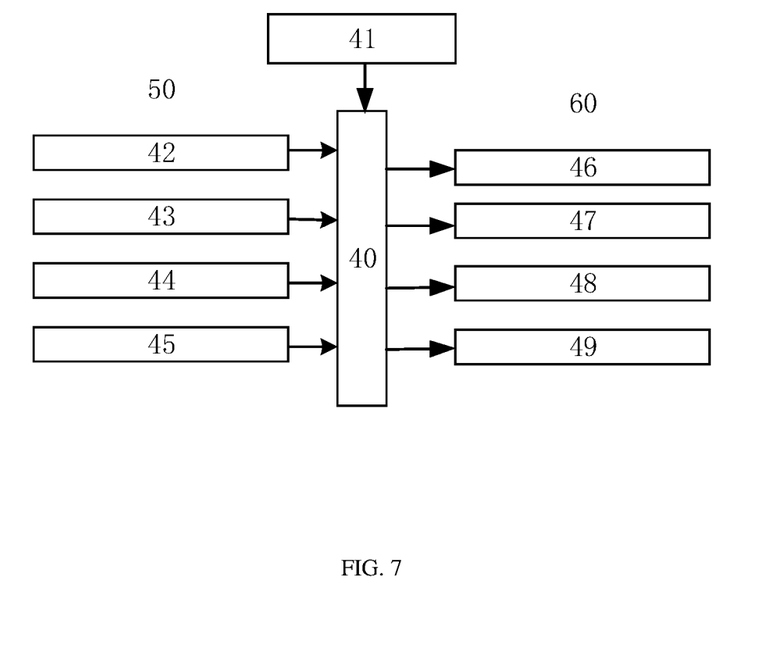
FIG. 7 is a schematic view of an intelligent loading and control system according to an embodiment of the disclosure.

The intelligent loading and control system 40 includes a target setting computer installed with a signal receiving part and a signal transmitting part. The target setting computer is used to set a water pressure, a vertical force, a loading mode and a loading speed.

The intelligent loading and control system 40 automatically collects data from the pressure gauge, the pressurized pump, the force measuring sensor 29 and the electric regulating valve 08; intelligently determines a difference between a set value and a force measured by the force measuring sensor, and sends a command to the power source so as to apply a vertical force or stop applying the vertical force through the force measuring sensor 29; and intelligently determines a difference between the set value and a value from the pressure gauge, and sends a water pressure adjustment command to the corresponding pressurized pump and the electric regulating valve 08, so as to adjust a water supply through starting or stopping the pressurized pump, and release excess water back to the water storage tank 01 through starting and stopping the electric regulating valve 08, thereby effectively ensuring that a water pressure supplied to the horizontal seepage test chamber reaches a predetermined value.

The signal receiving part is for receiving feedback signals, including signals from the first pressurized pump 05, the second pressurized pump 06, the third pressurized pump 07, the first pressure gauge 09, the second pressure gauge 101, the electric regulating valve 08 and the force measuring sensor 29.

The signal transmitting part is for transmitting signals for starting or stopping the first pressurized pump 05, the second pressurized pump 06 and the third pressurized pump 07, a signal for starting or stopping the power source 203, a signal indicating a target value of the force measuring sensor 29 and a signal for regulating an opening degree of the electric regulating valve 08.

The test system of the disclosure can realize intelligent graded loading of a water head pressure at the maximum. Because the left permeable plate can adopt different slopes, the infiltration water flow angle can be adjusted, the test materials can be layered, the seepage path is horizontal, and the size of the test piece can be up to 1 meter wide. An ultra-large seepage test system with a seepage path that can be switched between 1.0 meter, 1.5 meters and 2.0 meters can be achieved. The test system is used to carry out seepage tests on dam construction materials, and thus a permeability coefficient of a test piece, hydraulic gradient of seepage deformation and a filter performance of the filter materials can be determined.

Although the specific embodiments of the disclosure have been described with reference to the accompany drawings, it is not intended to limit the protection scope of the disclosure. It should be understood by those skilled in the art that on the basis of the technical solutions of the disclosure, various modifications or variations that can be made by those skilled in the art without creative labor are still within the protection scope of the disclosure.

What is claimed is:

1. A horizontal seepage test system with intelligent graded loading and variable seepage path, comprising a water storage system, a water pressure system, a horizontal seepage test system and a loading and control system;
wherein the water storage system, the water pressure system and the horizontal seepage test system are connected in sequence, the water pressure system is configured to apply a water pressure and a vertical pressure to a test piece to be tested in the horizontal seepage test system, an outlet valve of the horizontal seepage test system is connected to the water storage system, and the loading and control system is configured to control operations of electrical components of the water pressure system and the horizontal seepage test system.

2. The horizontal seepage test system according to claim 1, wherein the water storage system comprises a water storage tank and a backwater utilization pool, and the water storage tank is connected to the backwater utilization pool through an automatic submersible pump and a water pipe.

3. The horizontal seepage test system according to claim 2, wherein the water pressure system comprises three groups of inlet pipes connected in parallel to the water storage tank, the three groups of inlet pipes are provided with three inlet valves respectively, the three groups of inlet pipes are provided with three pressurized pumps behind the three inlet valves respectively, and the three groups of inlet pipes behind the three pressurized pump are merged into one group of inlet pipe and connected to the horizontal seepage test system, a first pressure gauge and a second pressure gauge are sequentially provided on the one group of inlet pipe, an electric regulating valve is arranged on an inlet pipe between the first and second pressure gauges, an outlet of the electric regulating valve is connected to the water storage tank through a pipeline and thereby the electric regulating valve is configured to release excess water back to the water storage tank.

4. The horizontal seepage test system according to claim 1, wherein the horizontal seepage test system comprises a horizontal seepage test chamber, a four-post cross-beam frame, a guide trail trolley, a power source and an actuator;
wherein the horizontal seepage test chamber is placed on the guide trail trolley, and the actuator is located directly below the guide trail trolley, the power source is connected to the actuator and is configured to provide a vertical force for the actuator, a force measuring sensor is provided under a middle of a top portion of the four-post cross-beam frame, and a lower part of the force measuring sensor is in contact with a top plate of the horizontal seepage test chamber.

5. The horizontal seepage test system according to claim 4, wherein the horizontal seepage test chamber comprises a rectangle-shaped body composed of a bottom plate, a top plate, a front side plate, a rear side plate, a left permeable plate and a right permeable plate;
wherein a sealed inlet pool is arranged outside the left permeable plate, and an inlet valve is arranged on the inlet pool, a sealed outlet pool is arranged outside the right permeable plate, and an outlet valve is installed on the outlet pool.

6. The horizontal seepage test system according to claim 5, wherein the left permeable plate is provided with circular holes with a diameter of 0.5 mm and a spacing of 0.5 mm, the left permeable plate is tightly connected to the front side plate, the rear side plate, the top plate and the bottom plate of the horizontal seepage test chamber, so as to ensure water flow to infiltrate into the test piece freely;
wherein a slope of the left permeable plate is one of 1:1, 1:1.3, 1:1.4, 1:1.5 and 1:1.6, and water inflow infiltration tests at different angles are able to be effectively carried out through replacing the left permeable plate with a permeable plate of a different slope.

7. The horizontal seepage test system according to claim 5, wherein the front side plate and the rear side plate are each provided with an observation window, and the observation window is sealed and installed on corresponding one of the front side plate and the rear side plate by a transparent material.

8. The horizontal seepage test system according to claim 5, wherein the inlet valve of the inlet pool is connected to a water pipe behind the second pressure gauge of the water pressure system, and water is pumped into the inlet pool by the pressurized pumps to keep the water to be full of the inlet pool and infiltrate into the horizontal seepage test chamber in a manner of crossing an entire cross-section of the left permeable plate, and the outlet valve is connected to the backwater utilization pool of the water storage system through a water pipe.

9. The horizontal seepage test system according to claim 4, wherein the four-post cross-beam frame comprises: four upright posts, and a transversal bearing plate sleeved on the four posts and being movable up and down relative to the four posts;
wherein a lower end of each of the upright posts is fixed on a foundation, and an upper end of each of the upright posts is connected to the transversal bearing plate for providing a counterforce, the transversal bearing plate flexibly and tightly contacts with the front side plate, the rear side plate, the left permeable plate and the right permeable plate of the horizontal seepage test chamber, and an infiltration water flow in the test piece is unable to infiltrate through portions of the transversal bearing plate contacting with the horizontal seepage test chamber.

10. The horizontal seepage test system according to claim 1, wherein the loading and control system comprises a target setting computer installed with a signal receiving part and a signal transmitting part.

* * * * *